(12) United States Patent
Cherian et al.

(10) Patent No.: US 8,037,523 B2
(45) Date of Patent: Oct. 11, 2011

(54) SINGLE SIGN-ON FOR OS BOOT IMAGE PROVISIONING AND OS LOGIN BASED ON USER IDENTITY

(75) Inventors: Jacob Cherian, Austin, TX (US); Yuan-Chang Lo, Austin, TX (US); Gaurav Chawla, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 963 days.

(21) Appl. No.: 11/961,079

(22) Filed: Dec. 20, 2007

(65) Prior Publication Data

US 2009/0165097 A1    Jun. 25, 2009

(51) Int. Cl.
*G06F 7/04* (2006.01)
*G06F 12/14* (2006.01)
(52) U.S. Cl. .................. 726/19; 726/5; 713/2
(58) Field of Classification Search ........ 713/2; 726/19, 726/5
See application file for complete search history.

(56) References Cited

U.S. PATENT DOCUMENTS

| | | | |
|---|---|---|---|
| 6,880,002 | B2 | 4/2005 | Hirschfeld et al. |
| 7,207,039 | B2 | 4/2007 | Komarla et al. |
| 7,395,324 | B1 * | 7/2008 | Murphy et al. ............... 709/223 |
| 2005/0050539 | A1 | 3/2005 | Burkhardt et al. |
| 2005/0071677 | A1 * | 3/2005 | Khanna et al. ............... 713/201 |
| 2005/0138423 | A1 | 6/2005 | Ranganathan |
| 2006/0218388 | A1 * | 9/2006 | Zur et al. ............... 713/2 |
| 2007/0098022 | A1 * | 5/2007 | Furuta ............... 370/503 |

OTHER PUBLICATIONS

Prasenjit Sarkar, Duncan Missimer, and Constantine Sapuntzakis; Bootstrapping Clients Using the iSCSI Protocol; Feb. 27, 2003; p. 1-p.10, http://tools.ietf.org/wg/ips/draft-ietf-ips-iscsi-boot/draft-ietf-ips-iscsi-boot-10-from-09.diff.txt.
Cisco Systems airespace; Cisco SWAN Release Notes 2.2.127.9; System Release 2.2; Mar. 22, 2005; p. 1-p. 16; OL-7431-01 Rev 1; http://www.cisco.com/univercd/cc/td/doc/product/wireless/control/c41/sysm.pdf.
Shannon Kietzman; Wisegeek; What Is Provisioning; 2007; p. 1-p. 3; Conjecture Corporation; http://www.wisegeek.com/what-is-provisioning.htm.
Provisioning—Wikipedia, the free encyclopedia; Provisioning; Nov. 13, 2007; p. 1-p. 4; Wikipedia Foundation, Inc.; http://en.wikipedia.org/wiki/Provisioning.

* cited by examiner

*Primary Examiner* — Kambiz Zand
*Assistant Examiner* — Aubrey Wyszynski
(74) *Attorney, Agent, or Firm* — Haynes and Boone, LLP

(57) ABSTRACT

A method for single sign-one for operating system (OS) boot image provisioning and OS login based on user identity includes receiving authentication information from an information handling system (IHS) over a network. The authentication information is associated with a user. The authentication information is sent to network services. Boot image information is received from the network services. The boot image information is associated with a boot image and the authentication information. The boot image is provisioned to the IHS over the network, wherein the boot image includes an OS that is configured to read the authentication information from a shared memory region of the IHS and use the authentication information to auto-login the user to the OS.

20 Claims, 3 Drawing Sheets

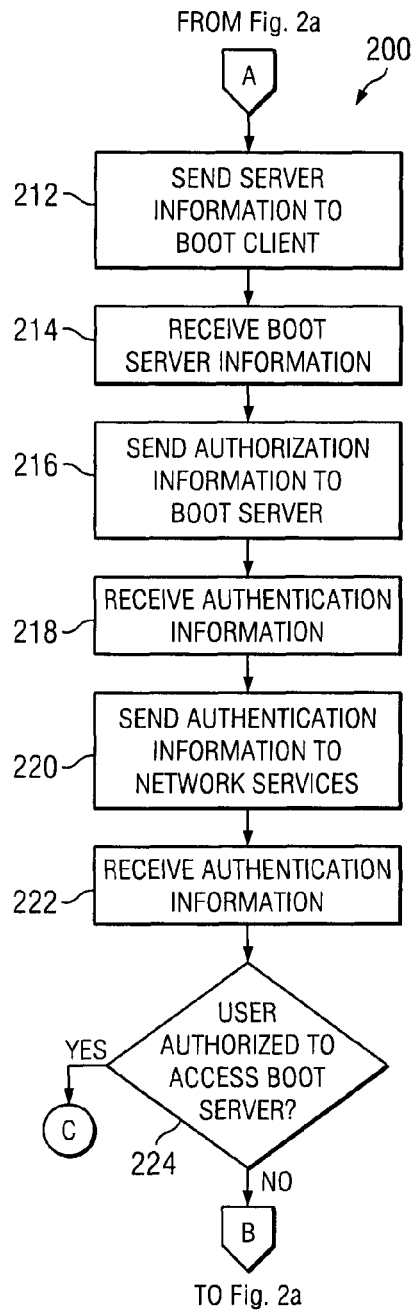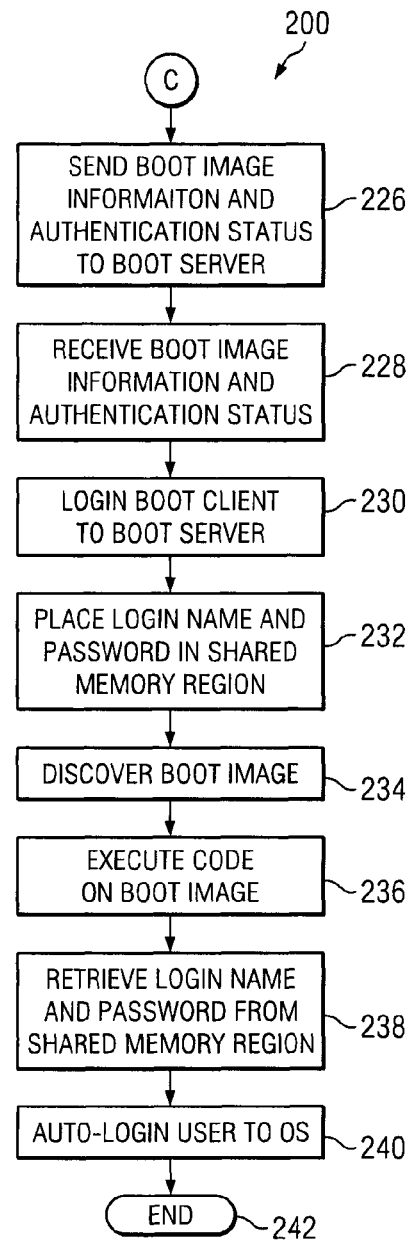
Fig 2b
Fig 2c

US 8,037,523 B2

1

SINGLE SIGN-ON FOR OS BOOT IMAGE PROVISIONING AND OS LOGIN BASED ON USER IDENTITY

CROSS REFERENCE TO RELATED APPLICATIONS

The present application is related to U.S. Utility application Ser. No. 11/961,048, filed on on Dec. 20, 2007, and U.S. Utility application Ser. No. 11/961,299, filed on Dec. 20, 2007, the disclosures of which are incorporated herein by reference.

BACKGROUND

The present disclosure relates generally to information handling systems, and more particularly to provisioning boot images to information handling systems.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some IHSs are diskless (i.e., do not include mass storage devices). A diskless IHS may not include an operating system (OS), and thus the diskless IHS may be required to access a boot image over a network for booting and loading an OS. Conventionally, a diskless IHS may always boot using the same boot image. This may meet the requirements for servers in a data center, for example, which always boot from the same boot image.

However, client systems (e.g., desktops, laptops) in an enterprise may need to support multiple users, each of whom may have the need to access a boot image tailored to the user, rather than to the IHS. Currently, there is not a storage standard that supports this requirement. Accordingly, it would be desirable to provide an improved system and method to provision boot images.

SUMMARY

According to one embodiment, a method for single sign-on for operating system (OS) boot image provisioning and OS login based on user identity includes receiving authentication information from an information handling system (IHS) over a network. The authentication information is associated with a user. The authentication information is sent to network services. Boot image information is received from the network services. The boot image information is associated with a boot image and the authentication information. The boot image is provisioned to the IHS over the network, wherein the boot image includes an OS that is configured to read the authentication information from a shared memory region of the IHS and use the authentication information to auto-login the user to the OS.

BRIEF DESCRIPTION OF THE DRAWINGS

FIG. 1b illustrates an embodiment of a boot client used in the system for provisioning a boot image of FIG. 1a.

FIG. 1c illustrates an embodiment of a boot server used in the system for provisioning a boot image of FIG. 1a.

FIG. 1d illustrates an embodiment of network services used in the system for provisioning a boot image of FIG. 1a.

FIGS. 2a, 2b, and 2c illustrate an embodiment of a method to provision a boot image using the system of FIG. 1a.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components. In an embodiment, the IHS may not include a mass storage device, and may receive one or more boot images over a network containing software for initializing, booting, and running an operating system on the IHS.

Figure 1A:
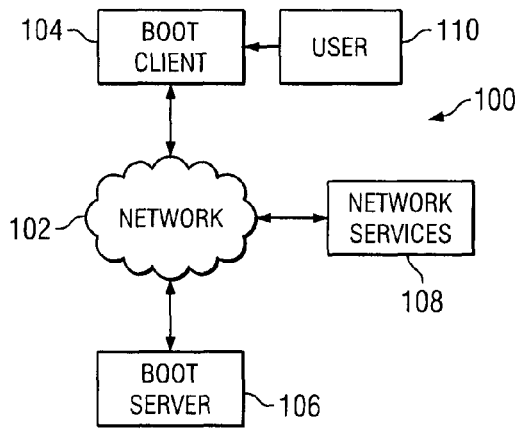
FIG. 1a illustrates an embodiment of a system for provisioning a boot image.

Referring now to FIG. 1a, an embodiment of a system 100 for provisioning a boot image is depicted. The system 100 includes a network 102 such as, for example, a Transport Control Protocol/Internet Protocol (TCP/IP) network (e.g., the Internet or an intranet). A boot client 104, a boot server 106, and network services 108 are operably coupled to the network 102 in order to allow communication between the boot client 104, the boot server 106, and the network services 108. The boot client 104 may be used by a user 110. Each of the boot client 104, the boot server 106, and the network services 108 may include one or more IHSs. For clarity, FIG. 1a depicts only one boot client, one boot server, one instance of network services, and one user. However, it should be understood that the system 100 may include a plurality of boot clients, boot services, network services, and users.

Figure 1B:
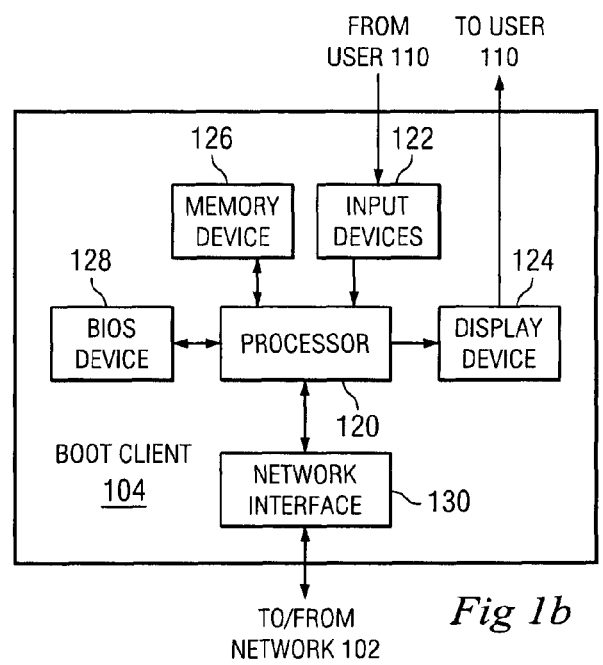

Referring now to FIG. 1b, the boot client 104 is illustrated in more detail. The boot client 104 includes a processor 120 for executing instructions. Input devices 122 are coupled to the processor 120 to provide input to the processor 120 from the user 110. Examples of input devices include keyboards, touchscreens, and pointing devices such as mouses, trackballs and trackpads. A display device 124 is coupled to the processor 120 to display information to the user 110. A memory device 126 is coupled to the processor to provide the processor with fast storage to facilitate the execution of instructions by the processor 120. A Basic Input/Output System (BIOS) device 128 is coupled to the processor to provide basic initialization and support instructions and data to the processor 120. The boot client 104 further includes a network interface 130 to allow the processor 120 to transmit data to and from the network 102. In an embodiment, the boot client 104 may be a diskless device. In an embodiment, the boot client 104 may include a desktop, laptop, server, or mobile device. In an embodiment, the boot client 104 may access boot images over the network 102 via a storage area network (SAN) or network-attached storage (NAS). In an embodiment, the boot client 104 may be an Internet Small Computer System Interface (iSCSI) initiator.

Figure 1D:
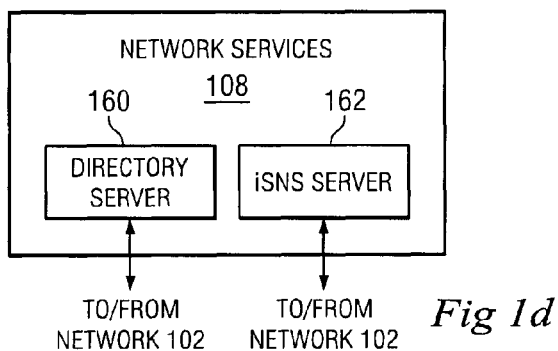
Figure 1C:
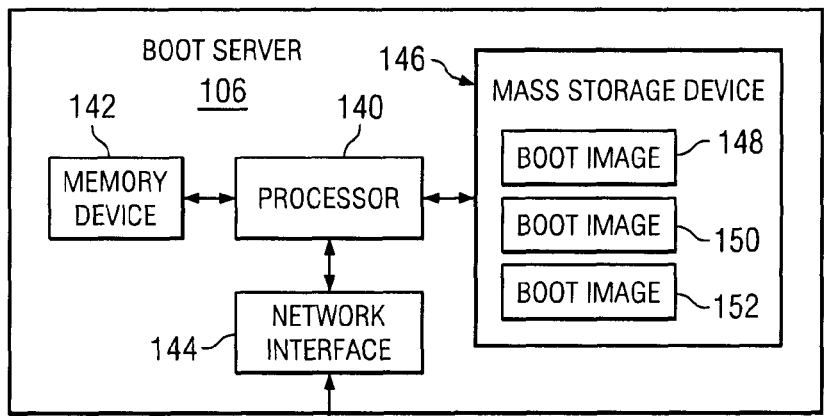

Referring now to FIG. 1c, the boot server 106 is illustrated in more detail. The boot server 106 includes a processor 140, a memory device 142, and a network interface 144, each of which may function in a manner similar to the processor 120, the memory device 126, and the network interface 130, respectively, of the boot client 104. The boot server 106 further includes a mass storage device 146, which includes boot images 148, 150, and 152. Each of the boot images 148, 150, and 152 may include programs and data for booting and/or initializing one or more boot clients such as the boot client 104. Each of the boot images 148, 150, and 152 may further include programs and data for running an OS and/or applications on one or more boot clients such as the boot client 104. In an embodiment, the mass storage device 146 may include only one boot image or any plurality of boot images. In an embodiment, the boot server 106 may provide the boot images 148, 150, and 152 over the network 102, and may be included in a storage area network (SAN) or may provide network-attached storage (NAS). In an embodiment, the boot server 106 may include an iSCSI boot target.

Referring now to FIG. 1d, the network services 108 are illustrated in more detail. The network services 108 include a directory server 160 and an Internet Storage Name Service (iSNS) server 162. The directory server 160 may include a directory service such as, for example, Active Directory, and may include information about a plurality of devices and users of the network 102, including authorization information. The authorization information may include a variety of information relating to authorizations of users and devices of the network 102. In an embodiment, each of the servers 160 and 162 may include an IHS. In an embodiment, the servers 160 and 162 may be included in a single IHS. In an embodiment, the network services 108 may not include one or both of the servers 160 and 162. In an embodiment, the network services 108 may include a variety of other servers and/or network services such as, for example, a storage name server, a Domain Name Server (DNS), a Dynamic Host Configuration Protocol (DHCP) server, a Bootstrap Protocol (BOOTP) server, and/or a Trivial File Transfer Protocol (TFTP) server.

Figure 2A:
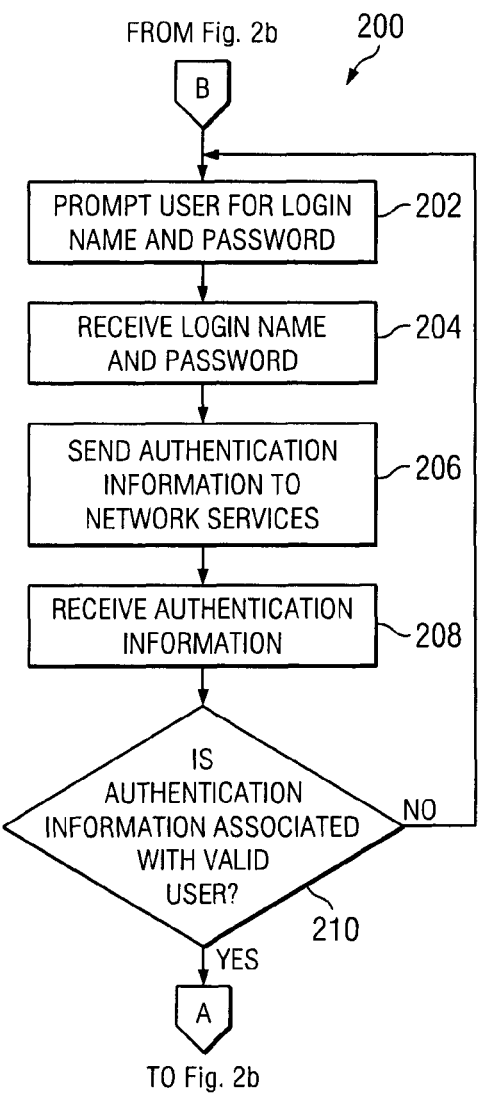

Referring now to FIGS. 2a, 2b, and 2c, an embodiment of a method 200 to provision a boot image is illustrated. The method 200 begins at block 202 where the boot client 104 prompts the user 110 for a login name and a password. The boot client 104 may prompt the user by using the display device 124. In an embodiment, prompting the user 110 is initiated by the processor 120, which may be executing instructions from the BIOS device 128. The login name and the password may be associated with the user 110. In an alternative embodiment, the login name and the password may be associated with a group of users. The method 200 then proceeds to block 204 where the boot client 104 receives the login name and the password from the user 110. The user 110 may enter the login name and the password by using one of the input devices 122 (e.g., the keyboard).

The method 200 then proceeds to block 206 where the boot client 104 sends authentication information to the network services 108. The authentication information includes the login name and the password received from the user 110, and may further include other information such as information about the boot client 104 or further information about the user 110. In an embodiment, the boot client 104 may send the authentication information directly to the directory server 160 of the network services 108. In an embodiment, the sending of the authentication information is initiated by the processor 120, which may be executing instructions from the BIOS device 128.

The method 200 then proceeds to block 208 where the network services 108 receive the authentication information from the boot client 104. The method 200 then proceeds to decision block 210 where the network services 108 determine whether the authentication information is associated with a valid user, such as the user 110. In an embodiment, the determination is made by the directory server 160, which may use the authorization information, described above, to determine whether the authentication information is associated with a valid user. In an embodiment, the network services 108 may further determine whether the authentication information is associated with a valid boot client such as boot client 104. If at decision block 210 the network services 108 determine that the authentication information is not associated with a valid user, the method 200 proceeds to block 211 where the network services 108 return a failure authentication status to the boot client 104. The failure authentication status may include a message indicating that the authentication information is invalid. The method 200 then returns to block 202 where the boot client 104 prompts the user 110 for a login name and a password.

If at decision block 210 the network services 108 determine that the authentication information is associated with a valid user, the method 200 then proceeds to block 212 where the network services 108 send boot server information to the boot client 104. The boot server information includes information about the boot server 106 such as, for example, an IP address, a port number, a host name, and/or a communication protocol. In an embodiment, the network services 108 may further send boot image information, described below, to the boot client 104. The boot server information may be associated with the user 110. For example, the user 110 may be authorized to access the boot server 106, and thus the boot server information may include information relating to the boot server 106. In an embodiment, some or all of the boot server information may be sent by the directory server 160 and/or the iSNS server 162 of the network services 108. In an embodiment, the network services 108 may assign a SAN identifier, such as an iSCSI Qualified Name (IQN), to the boot client 104, and may send the SAN identifier to the boot client 104 in order to allow the boot client 104 to access the SAN.

The method 200 then proceeds to block 214 where the boot client 104 receives the boot server information from the network services 108. The method 200 then proceeds to block 216 where the boot client 104 sends the authentication information to the boot server 106. In an embodiment, the boot client 104 may also send the SAN identifier of the boot client 104 to the boot server 106. In an embodiment, the boot client 104 may further send part or all of the boot image information, such as, for example, information relating to one of the boot images 148, 150, and 152, to the boot server 106.

The method 200 then proceeds to block 218 where the boot server 106 receives the authentication information from the boot client 104. The method 200 then proceeds to block 220 where the boot server 106 sends the authentication information to the network services 108. In an embodiment, the boot server 106 may further send the SAN identifier of the boot client 104 and/or all or part of the boot image information to the network services 108. In an embodiment, the boot server 106 may send the authentication information to the directory server 160 of the network services 108.

The method 200 then proceeds to block 222 where the network services 108 receive the authentication information from the boot server 106. The method 200 then proceeds to decision block 224 where the network services 108 determine whether the user 110 associated with the authentication information is authorized to access the boot server 106. In an embodiment, the network services 108 may additionally use the SAN identifier of the boot client 104, the boot server information, and/or the boot image information to determine whether authorization is granted. In an embodiment, the determination may be made by the directory server 160 of the network services 108.

If at decision block 224 the network services 108 determine that the user 110 associated with the authentication information is not authorized to access the boot server 106, the method 200 proceeds to block 225 where the network services 108 send a failure authentication status to the boot server 106. The method 200 then proceeds to block 226 where the boot server 106 sends the failed authentication status to the boot client 104. The method then returns to block 202 where the boot client 104 prompts the user 110 for a login name and a password.

If at decision block 224 the network services 108 determine that the user 110 associated with the authentication information is authorized to access the boot server 106, the method 200 proceeds to block 227 where the network services 108 send boot image information and a success authentication status to the boot server 106. The boot image information includes information about a selected boot image such as, for example, a Logical Unit Number (LUN), an image type, an image name, an image path, and/or a identification number. The selected boot image may be selected by the network services 108 from one of the boot images 148, 150, and 152. The selected boot image may be selected by the network services 108 from the boot images 148, 150, and 152 using one or more selection policies including the provision of an unmodified boot image (i.e., a boot image that hasn't been modified by the user 110), a modified boot image (i.e., a boot image that has been modified by the user 110), a shared boot image (i.e., a boot image used by more than one user), and a dedicated boot image (i.e., a boot image used only by the user 110). It should be understood that a variety of other selection policies may be used. In an embodiment, a combination of selection policies may be used. For example, a shared and unmodified boot image may be used. In an embodiment, the selection policies may be assigned to the user 110 by a system administrator and/or by the user 110. The success authentication status may include a message indicating that the authentication information is valid.

The method 200 then proceeds to block 228 where the boot server 106 receives the boot image information and the success authentication status from the network services 108. The method 200 then proceeds to block 229 where the boot server 106 sends the success authentication status to the boot client 104. The method 200 then proceeds to block 230 where the boot client 104 is logged into the boot server 106. In an embodiment, the boot server 106 may make the selected boot image available by assigning the LUN of the boot image information to the selected boot image. In an alternative embodiment, the boot server 106 may specify the LUN, or may use a default LUN value such as, for example, zero.

The method 200 then proceeds to block 232 where the boot client 104 places the login name and the password into a shared memory region. In an embodiment, the shared memory region may include a region in the memory device 126 of the boot client 104. In an embodiment, the shared memory region may include any other storage or message passing mechanism that may allow communication between the BIOS on the boot client 104 and the OS on the boot client. The shared memory region may be readable by OS code, and may be writeable by BIOS code. In an embodiment, the login name and the password may be included in a modified iSCSI Boot Firmware Table (iBFT), wherein the modified iBFT includes an iBFT that has been modified or extended to include a login name and a password. The BIOS may write the modified iBFT, including the login name and the password, to the shared memory region.

The method 200 then proceeds to block 234 where the boot client 104 discovers the selected boot image on the boot server 106. In an embodiment, the boot client 104 may use some or all of the boot image information to discover the selected boot image. In an embodiment, the boot client 104 may mount the selected boot image. In an embodiment, the selected boot image may appear to the boot client 104 to be located on a local disk. In an alternative embodiment, the selected boot image may appear to the boot client 104 to be located on a remote disk. In an embodiment, the boot client 104 may transfer some or all of the contents of the selected boot image to the memory device 126.

The method 200 then proceeds to block 236 where the boot client 104 executes instructions on the selected boot image. The instructions include OS instructions, and may further include initialization instructions. The instructions may be executed by the processor 120 of the boot client 104 to initialize, load, and run the OS on the boot client 104. In an embodiment, the boot client 104 may further access data on the selected boot image.

The method 200 then proceeds to block 238 where the OS retrieves the login name and the password from the shared memory region. In an embodiment, the OS may read a modified iBFT, described above with reference to block 232, from the shared memory region. The modified iBFT may have been written to the shared memory region by the BIOS, and may include the login name and the password.

The method 200 then proceeds to block 240 where the user is auto-logged in to the OS (i.e., logged in without further input from the user 110). The OS may allow the user 110 to be auto-logged in to the OS using the login name and the password that the OS retrieved from the shared memory region in block 238. Accordingly, the method 200 allows the user 110 to login to the boot client 104 only once (i.e., at block 204) in order for the boot client 104 to retrieve the boot image and auto-login to the boot client 104. The method 200 then ends at block 242.

Thus, embodiments are provided for enabling a boot image to be provisioned to an authenticated user of the boot client. The boot image is provisioned based on an identity of the user. The boot image is stored in a shared memory region that is shared by the BIOS and the OS. The user may be provisioned a dedicated boot image or an image that is shared with other users.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An information handling system (IHS), comprising:
 a processor; and
 a memory coupled to the processor, wherein the memory includes a shared memory region that is accessible by an operating system (OS) and a basic input/output system (BIOS), and wherein the memory further includes computer-readable instructions for the BIOS to:
   prompt a user for authentication information;
   receive the authentication information from the user;
   write the authentication information in the shared memory region;

send the authentication information to network services;
receive boot server information from the network services over a network, wherein the boot server information is associated with a boot server and the authentication information;
send the authentication information to the boot server; and
access a boot image on the boot server, wherein the boot image includes an OS that is configured to read the authentication information from the shared memory region and use the authentication information to auto-login the user to the OS.

2. The IHS of claim 1, wherein the authentication information includes a login name of the user and a password of the user.

3. The IHS of claim 1, wherein the memory further includes computer-readable instructions to receive an initiator Internet Small Computer System Interface Qualified Name (IQN).

4. The IHS of claim 1, wherein the boot server includes an Internet Small Computer System Interface (iSCSI) boot target.

5. The IHS of claim 1, wherein the boot server information includes Internet Small Computer System Interface (iSCSI) boot target information.

6. The IHS of claim 1, wherein the shared memory region is an adjusted Internet Small Computer System Interface Boot Firmware Table (IBFT), and wherein the adjusted IBFT has been adjusted to store the authentication information written by the BIOS such that the OS may read the authentication information from the IBFT.

7. A method comprising:
receiving authentication information from an information handling system (IHS) over a network, wherein the authentication information is associated with a user;
sending the authentication information to network services;
receiving boot image information from the network services, wherein the boot image information is associated with a boot image and the authentication information; and
provisioning the boot image to the IHS over the network, wherein the boot image includes an operating system (OS) that is configured to read the authentication information from a shared memory region of the IHS and use the authentication information to auto-login the user to the OS, and wherein the authentication information was written to the shared memory region of the IHS by a Basic Input Output System (BIOS) in the IHS.

8. The method of claim 7, wherein the IHS is a boot client.

9. The method of claim 7, wherein the boot image information includes a logical unit number (LUN).

10. The method of claim 7, wherein the network services include a directory server and an Internet Storage Name Service (iSNS) server.

11. The method of claim 8, wherein the boot client includes an Internet Small Computer System Interface (iSCSI) initiator.

12. An information handling system (IHS) comprising:
a processor; and
a memory coupled to the processor, wherein the memory includes computer-readable instructions executable by the processor to:
receive authentication information from an information handling system (IHS) over a network, wherein the authentication information is associated with a user;
send the authentication information to network services;
receive boot image information from the network services, wherein the boot image information is associated with a boot image and the authentication information; and
provision the boot image to the IHS over the network, wherein the boot image includes an operating system (OS) that is configured to read the authentication information from a shared memory region of the IHS and use the authentication information to auto-login the user to the OS, and wherein the authentication information was written to the shared memory region of the IHS by a Basic Input Output System (BIOS) in the IHS.

13. The system of claim 12, wherein the IHS is a boot client.

14. The system of claim 12, wherein the boot image information includes a logical unit number (LUN).

15. The system of claim 12, wherein the network services include a directory server and an Internet Storage Name Service (iSNS) server.

16. The system of claim 13, wherein the boot client includes an Internet Small Computer System Interface (iSCSI) initiator.

17. The system of claim 12, wherein the shared memory region is an adjusted iSCSI Boot Firmware Table (IBFT), and wherein the adjusted IBFT has been adjusted to store the authentication information written by the BIOS such that the OS may read the authentication information from the IBFT.

18. The system of claim 17, wherein the authentication information includes a login name and a password.

19. The system of claim 12, wherein the boot image is used to boot the IHS.

20. An information handling system (IHS) comprising:
a processor; and
a memory coupled to the processor, wherein the memory includes computer-readable instructions executable by the processor to:
prompt for authentication information;
receive the authentication information, wherein the authentication information is associated with a user
write, by a Basic Input Output System (BIOS), the authentication information to an adjusted iSCSI Boot Firmware Table (IBFT) in the memory;
send the authentication information to network services over a network;
receive boot server information from the network services over the network, wherein the boot server information is associated with a boot server and the authentication information;
send the authentication information to the boot server over the network;
access a boot image on the boot server over the network;
boot the IHS using the boot image to run an operating system (OS) on the IHS; and
read, using the OS, the authentication information from adjusted IBFT in the IHS and use the authentication information to auto-login the user to the OS.

* * * * *